(12) United States Patent
Gabriel et al.

(10) Patent No.: US 8,349,758 B2
(45) Date of Patent: Jan. 8, 2013

(54) CATALYST DESIGN AND PREPARATION PROCESS FOR STEAM-REFORMING CATALYSTS

(75) Inventors: Wolfgang Gabriel, Rosenheim (DE);
Ingo Hanke, Bad Vilbel (DE)

(73) Assignee: Sud-Chemie AG, Munich (DE)

( * ) Notice: Subject to any disclaimer, the term of this patent is extended or adjusted under 35 U.S.C. 154(b) by 236 days.

(21) Appl. No.: 12/237,772

(22) Filed: Sep. 25, 2008

(65) Prior Publication Data

US 2009/0111687 A1    Apr. 30, 2009

(30) Foreign Application Priority Data

Sep. 27, 2007  (DE) .......................... 10 2007 046 297

(51) Int. Cl.
| | |
|---|---|
| *B01J 27/224* | (2006.01) |
| *B01J 27/24* | (2006.01) |
| *B01J 21/00* | (2006.01) |
| *B01J 23/32* | (2006.01) |
| *B01J 23/00* | (2006.01) |
| *B01J 23/40* | (2006.01) |
| *B01J 23/42* | (2006.01) |
| *B01J 23/58* | (2006.01) |
| *B01J 23/72* | (2006.01) |
| *B01J 10/00* | (2006.01) |
| *B01J 10/02* | (2006.01) |
| *B01J 12/00* | (2006.01) |
| *B01J 12/02* | (2006.01) |
| *B01J 14/00* | (2006.01) |
| *B01J 15/00* | (2006.01) |
| *B01J 16/00* | (2006.01) |
| *B01J 8/02* | (2006.01) |
| *B01J 35/02* | (2006.01) |
| *B01J 8/08* | (2006.01) |
| *B01J 19/00* | (2006.01) |
| *B28B 1/00* | (2006.01) |
| *B28B 3/00* | (2006.01) |
| *B28B 5/00* | (2006.01) |
| *C04B 33/32* | (2006.01) |
| *C04B 33/36* | (2006.01) |
| *C04B 35/64* | (2006.01) |
| *B32B 3/12* | (2006.01) |

(52) U.S. Cl. ........ 502/178; 502/200; 502/240; 502/324; 502/325; 502/326; 502/330; 502/331; 502/439; 502/527.11; 502/527.14; 502/527.19; 502/527.21; 502/527.24; 264/630; 264/643; 264/645; 264/681; 264/682; 264/683; 428/116; 428/117; 428/118; 422/129; 422/211; 422/213; 422/218; 422/221

(58) Field of Classification Search .................. 502/178, 502/200, 240, 324–326, 330, 331, 439, 527.11, 502/527.14, 527.19, 527.21, 527.24; 264/630, 264/643, 645, 681–683; 428/116–118
See application file for complete search history.

(56) References Cited

U.S. PATENT DOCUMENTS 5,427,601 A * 6/1995 Harada et al. .................... 75/235
(Continued)

FOREIGN PATENT DOCUMENTS

| DE | 19618129 A1 | 11/1997 |
|---|---|---|
| DE | 19828491 A1 | 12/1999 |
| DE | 60030127 T2 | 3/2007 |

(Continued)

*Primary Examiner* — Patricia L Hailey
(74) *Attorney, Agent, or Firm* — RatnerPrestia

(57) ABSTRACT

A catalyst with large surface area structure, in particular for steam-reforming catalysts, which is characterized in that the large surface area structure is formed of a large number of round or parallel penetrating holes of polygonal cross-section, wherein the catalyst carrier is prepared in the injection molding process, coated with a washcoat and then impregnated with the active component. The catalyst carrier includes at least one sinterable material and has a lateral pressure resistance of at least 700 N. Also, a process for the preparation of such catalysts and the use thereof in a reactor.

28 Claims, 3 Drawing Sheets

U.S. PATENT DOCUMENTS

| | | | |
|---|---|---|---|
| 5,935,896 A | 8/1999 | Dupuis et al. | |
| 6,316,383 B1 | 11/2001 | Tacke et al. | |
| 6,432,856 B1 | 8/2002 | Beall et al. | |
| 6,773,657 B2 | 8/2004 | Beall et al. | |
| 6,849,572 B2 * | 2/2005 | Hwang et al. | 502/325 |
| 7,399,728 B2 * | 7/2008 | LaBarge | 502/325 |
| 7,501,098 B2 * | 3/2009 | Chen et al. | 422/177 |
| 7,517,510 B2 * | 4/2009 | Chen et al. | 423/213.2 |
| 2005/0191233 A1 | 9/2005 | Jiang et al. | |

FOREIGN PATENT DOCUMENTS

| | | |
|---|---|---|
| JP | 04193781 | 7/1992 |
| JP | 05307394 | 11/1993 |
| JP | 07241881 | 9/1995 |
| JP | 11216885 | 8/1999 |
| JP | 2005262070 | 9/2005 |
| WO | WO 2006/114320 | 11/2006 |
| WO | WO/2007/068732 A1 | 6/2007 |

* cited by examiner

CATALYST DESIGN AND PREPARATION PROCESS FOR STEAM-REFORMING CATALYSTS

The invention relates to a novel catalyst design of large surface area structure. The invention further relates to a preparation process for the novel catalysts and the use thereof in steam-reforming reactions, ATR and in catalytic partial oxidation reactions (CPOX).

Steam reforming is the most widespread process for the generation of hydrogen-rich synthesis gas from light hydrocarbons and steam. The substances used such as for example natural gas, LPG, naphtha and also methane are endothermically converted with steam to synthesis gas of high hydrogen content in catalytic reactors. Process and flue gas heat are for example utilised for steam generation or for preheating various processes and water streams. This process is mostly effected in large-scale plants at temperatures of about 550-900° C. and a pressure from ca. 25 to 60 bar, and for ATR (autothermic reforming) even up to about 80 bar.

The general reaction equation for such a conversion is:

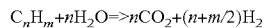
$$C_nH_m + nH_2O \Rightarrow nCO_2 + (n+m/2)H_2$$

For example a steam-reforming reaction of methane may be mentioned:

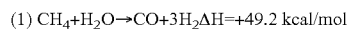
(1) $CH_4 + H_2O \rightarrow CO + 3H_2 \Delta H = +49.2$ kcal/mol

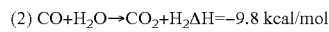
(2) $CO + H_2O \rightarrow CO_2 + H_2 \Delta H = -9.8$ kcal/mol

The first reaction is a strongly endothermic reaction, which usually requires a reforming catalyst (e.g. a Ni catalyst).

The second process step, the exothermic catalytic reaction of the resulting carbon monoxide with steam, is also referred to as the shift reaction.

A problem with steam-reforming reactions with conventional catalyst geometries, for example in fixed bed or tubular reactors, is the minimisation of the pressure drop. With small catalysts with large surface area, the pressure drop is often increased by the catalyst packing, as a result of which the yield of the reaction falls. In steam reforming, the heat input is also a limiting factor (endothermic reaction). Catalyst carriers with good thermal conductivity are therefore desirable. This can for example be achieved through the use of heat-conducting ceramics (e.g. SiC) or by addition of metal powder (e.g. nickel) to the ceramic mixture (ceramic/metal composite), before this is injection moulded.

For the reduction of the pressure drop, cylindrical hollow bodies (Raschig rings) were previously used as catalysts. In order nonetheless to obtain a sufficiently large surface area, attempts were made to make the walls of these hollow cylinders thinner, as for example described in U.S. Pat. No. 4,089, 941 A, U.S. Pat. No. 4,233,187 A, GB 1,513,544 and FR 2,375,138. However, this leads to decreasing mechanical stability of such catalysts.

In order to obtain adequate mechanical stability, for example EP 0 192 314 A1 describes a catalyst in the form of a saddle made of a calcined calcium aluminate cement mixture. The reactive surface area of such a catalyst is however limited, as in the case of the hollow cylinders.

Another well-known conventional catalyst for steam reforming is G-90 LDP from the firm Süd-Chemie AG, as disclosed for example in WO 2006/016983 A2. This is produced in a costly, multistage process. Such a catalyst likewise has the disadvantage that the magnitude of the external surface area, on which the catalytic reaction proceeds, is limited.

Thus catalyst which provides a large surface area for chemical reactions, has high mechanical durability and is also simple to prepare would be desirable.

This problem is solved through a catalyst with large surface area structure, which is characterised in that the large surface area structure is formed of a large number of parallel penetrating holes of round or polygonal cross-section, wherein the catalyst includes at least one sinterable material and has a lateral pressure resistance of at least 700 N. Also, the large surface area structure preferably has a honeycomb shape.

The large surface area structure is obtained by a shaping process, preferably injection moulding of the at least one sinterable material in an injection mould, where the injection moulding process allows any desired shaping. The term "large surface area" in the present case means that the structure has 10-300 penetrating holes per $cm^2$ face area.

Thus a process for the preparation of a catalyst with large surface area structure having a lateral pressure resistance of at least 700 N comprising the steps
a) Grinding of a sinterable material to a powder;
b) Treatment of the sinterable material with a dispersant;
c) Heating and mixing of the resulting composition so as to obtain a plastic mixture;
d) Injection of the plastic mixture into an injection mould and
e) Cooling, removal from mould and calcination of the mixture also lies within the scope of the invention.

If necessary, a heat conducting material, e.g. a metal such as nickel, etc. can be added to the sinterable material.

Figure 1:
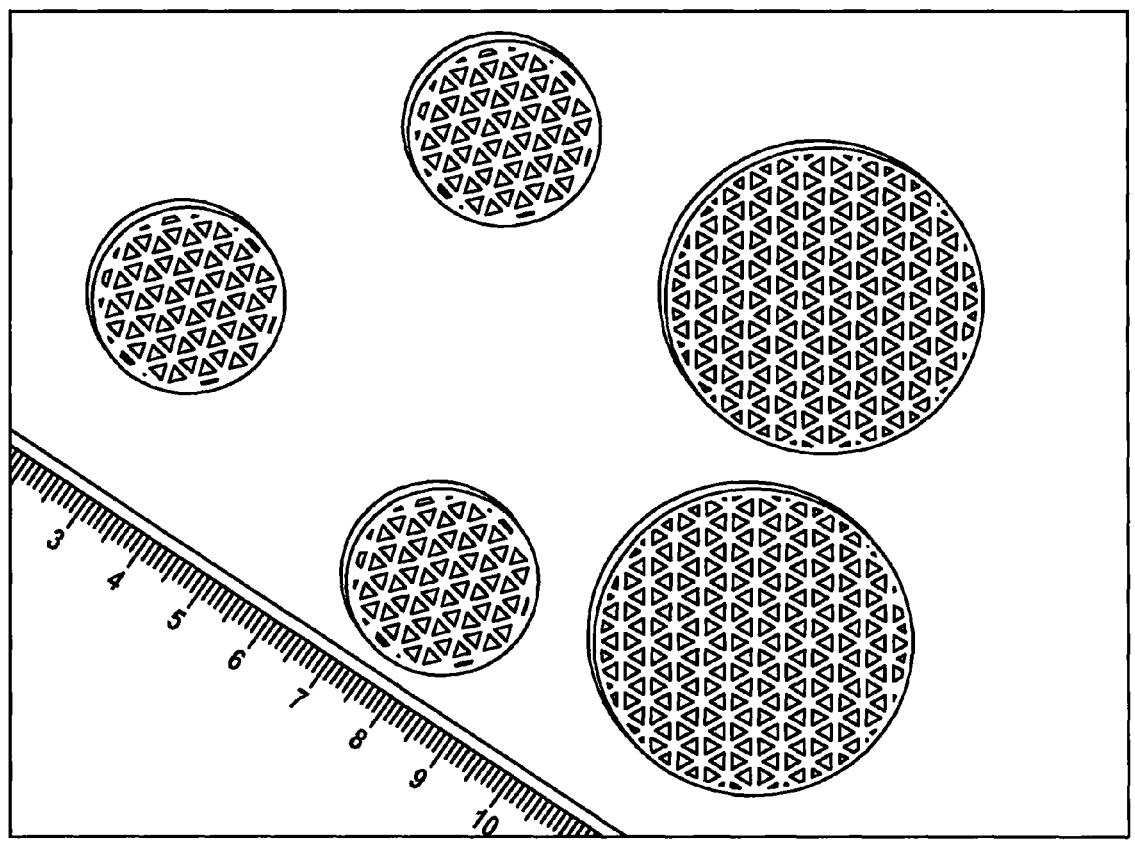
FIG. 1 depicts illustrative carriers in accordance with the invention, as described in Example 1.

The mixing of the composition, i.e. of the sinterable material with the dispersant is preferably effected with heating at 30 to 150° C. The dispersant serves to make it possible to convert the sinterable material and the other components to a plastic mixture. The preferred dispersant is paraffin oil, but other dispersants such as polyolefin wax mixtures, polyalcohols, polyvinyl alcohols, etc. can also be used.

The heating and mixing of the composition in order to obtain the plastic mixture can most simply be effected in an extruder, as a result of which very homogeneous mixing is achieved. Alternatively, other processes, for example in a mixer, a mill or a kneading device are also usable.

The injection mould here should be formed such that the large surface area structure of the catalyst has 10 to 300, preferably 20 to 250 and especially preferably 25 to 225 clear penetrating holes per $cm^2$ face area. The catalysts with large surface area structure are preferably vertical circular cylinders, where the diameter of the cylinder 5 to 25 mm, in particular 10 to 20 mm, especially preferably 10 to 19 mm and the height of the cylinder 5 to 25 mm, in particular 10 to 16 mm. However, all conceivable shapes are possible through the injection moulding process. The cross-sections of the penetrating holes can be made round, triangular, rectangular and/or hexagonal. Especially preferably, the large surface area structure is a honeycomb-shaped structure.

The at least one sinterable material for the catalyst is a metal oxide and/or a ceramic. Preferably the at least one sinterable material is selected from an aluminate, silicate, titanate, from titanium dioxide, aluminium oxide, magnesium oxide, zirconium oxide, aluminium titanate, piezo ceramics, technical porcelain, steatite, cordierite, mullite ceramics, carbides, silicon carbide, boron carbide, nitrides, silicon nitride, aluminium nitride, silicon aluminium oxynitride, calcium aluminate, potassium aluminate or magnesium aluminate or combinations of the aforesaid.

Ceramics are most preferred. Oxide ceramics mostly contain more than 90% of single-phase or single-component metal oxides. The most important representatives are aluminium oxide ($Al_2O_3$), magnesium oxide (MgO), zirconium oxide ($ZrO_2$), aluminium titanate ($Al_2TiO_5$) and piezo ceramics. The silicate ceramics include for example technical porcelains, steatite, cordierite and mullite ceramics. The main components are clay and kaolin, and feldspar and soapstone as silicate carriers. Furthermore, non-oxide ceramics are possible. The group of non-oxide ceramics for example includes the carbides (silicon carbides with different production processes, boron carbides) and nitrides (silicon nitride, aluminium nitride, silicon aluminium oxynitride). A high content of covalent bonds imparts very good mechanical properties to these materials even at high temperatures.

The sinterable material can make up from >0 to 100 wt. %, preferably 10 to 99 wt. %, especially preferably 50 to 95 wt. %, based on the weight of the catalyst.

The catalyst can also contain a binder. Suitable binders are for example kaolin, clay or fluxes. The binder can also be a sol, for example a sol of nano-particles of $Al_2O_3$ (for example Disperal® from Sasol) or $ZrO_2$ (for example Zr acetate from Mel Chemicals, NYACOL® products). Also preferred are cerium oxide sols (e.g. von NYACOL), silicon dioxide sols (e.g. Köstrosol®) and titanium dioxide sols (e.g. from Sachleben Chemie). Sols are understood to mean clear solutions which contain nanoparticles in the size range of about 2-50 nm. The commercially available sols are usually acetate-stabilised sols or nitrate-stabilised sols (nitric acid).

In addition, an opening material, e.g. cellulose, can be added to the binder. This has the advantage that after a calcination step the opening material is burnt out and thereby the pore volume of the catalyst is increased. However, a prerequisite for this is that the opening material is completely burnt, so that no residues remain which could block the pores. Accordingly, other compounds, in particular organic compounds, such as paraffins, waxes, and thermoplastics, which fulfil the requirement of complete burning, can also be added as the opening material. The addition of coupling agents and other additives, admixtures, fillers, promoters known in the state of the art and the like can also be advantageous.

The pore volume of the catalyst should preferably lie in the range from 0.2 $cm^3/g$ to 1 $cm^3/g$, in particular between 0.2 and 0.5 $cm^3/g$. Especially preferably, the pore volume lies in the range between 0.2 and 0.4 $cm^3/g$. The pore volume is determined by the mercury intrusion method in accordance with DIN 66133. In particular, the pore volume is the specific total pore volume (based on pores with radii from 3.7-7500 nm). The pore radius can be determined using the Washburn equation in accordance with DIN 66133.

The catalyst or the at least one sinterable material further includes a catalytically active, or activatable material. Preferably the catalytically active or activatable material is a metal oxide selected from the oxides of nickel, platinum, palladium, rhodium, ruthenium, copper, silver, gold, cobalt, manganese or iron. Especially preferable are nickel, platinum and rhodium oxide. For ATR and CPOX, platinum or rhodium oxide are most preferred. The oxides are typically only activated after the charging of the catalyst into the reactor, i.e. for example reduced with hydrogen to the actually catalytically active metal.

The catalyst can additionally include a coating. The coating is usually applied onto the catalyst after the calcination. For this, the processes well-known in the state of the art, e.g. application of a washcoat or spray impregnation, can be used. The coating serves to increase the BET surface area of the catalyst, and to suppress undesired soot formation and is preferably selected from oxides of the rare earths (e.g. lanthanum, cerium or cerium/lanthanum stabilised gamma aluminium oxide) aluminate, titanate, titanium dioxide, aluminium oxide, magnesium oxide, zirconium oxide, aluminium titanate, calcium aluminate, potassium aluminate or magnesium aluminate or combinations of the aforesaid. Especially preferable is cerium/lanthanum stabilised gamma aluminium oxide.

The coating can also contain a binder. Suitable binders are for example kaolin, clay or flux. The binder can also be a sol, for example a sol of nanoparticles of $Al_2O_3$ (for example Disperal® from Sasol) or $ZrO_2$ (for example Zr acetate from Mel Chemicals, NYACOL® products). Also preferred are cerium oxide sols (e.g. from NYACOL), silicon dioxide sols (e.g. Köstrosol®) and titanium dioxide sols (e.g. from Sachleben Chemie). Furthermore, the binder can be a saturated metal salt solution.

An especially preferable binder is saturated aluminium nitrate solution, which on calcination forms nanoscopic aluminium oxide particles, which again act as coupling agents between washcoat powder and injection moulded carrier.

The catalyst carrier and/or the coating can also contain lanthanides (rare earths), and elements of the first or second main group (e.g. potassium or strontium), in order firstly to stabilise the specific surface area (BET) and secondly to suppress the undesired side reaction of soot formation.

Here, as high as possible a BET surface area, in general a BET surface area of more than 0.4 $m^2/g$, in particular between 0.5 and 300 $m^2/g$ and especially preferably between 1 and 50 $m^2/g$, is preferable. The BET surface area is determined by the nitrogen single point method in accordance with DIN 66132. A BET surface area of 50 $m^2/g$ is for example achieved in operation of the catalyst at a temperature of 900° C.

The catalytically active or activatable material can either already be mixed with the sinterable material during the preparation of the catalyst carrier or be mixed with the washcoat during a subsequent coating of the catalyst, or the catalytically active material is applied after coating of the catalyst with a washcoat has been effected, in the form of an impregnation with the metal salt solution, e.g. the corresponding nitrate, acetate, etc., and then calcined, whereby the corresponding metal oxide is formed. In this, the processes well-known in the state of the art, for example dip or spray impregnation, can be used. It is also possible for all variants to be used jointly.

The catalyst thus obtained can be used as a steam-reforming catalyst, catalyst for ATR or as a catalyst for partial catalytic oxidation (CPOX). The catalyst is preferably used in a reactor where firstly, before the start of the catalytic reaction, the catalytically active metal is generated by in-situ reduction, e.g. with hydrogen. Possible reactors are fixed bed, tubular and tube bundle reactors.

For this, the catalyst with large surface area structure can be present in the reactor in the form of a loose packing. The loose packing is suitable for fixed bed and tubular reactors.

PRACTICAL EXAMPLES

Example 1

Preparation of a Catalyst Carrier with Honeycomb-Shaped Structure

Calcium aluminate was ground in a ball mill, treated with paraffin oil and mixed in a double-screw extruder and heat to 150° C. The resulting mixture was transferred into an injection mould of honeycomb structure. The mould was cooled and the crude catalyst removed from the mould and sintered. Carriers prepared according to the invention can be seen in FIG. 1.

Example 2

Preparation of a Coated Catalyst Carrier with Honeycomb-Shaped Structure

The catalyst carrier was prepared as in Example 1, except that aluminium oxide was used instead of calcium aluminate. After the sintering, the carrier was coated with the washcoat Clay Met (stabilised gamma aluminium oxide), dried and calcined.

Example 3

Activity Tests on Three Different Catalysts

Three samples were prepared. For this, conventional G-90 LDP carrier (Süd-Chemie AG) and injection moulded carriers according to the invention were broken down to a size of ca. 5×5 mm, without destroying the honeycomb structure.

G-90 LDP, and one sample of the injection moulded carriers, were impregnated with nickel nitrate solution, whereby a nickel content of 10% based on the washcoat was attained.

A further sample of the injection moulded carriers was coated with the washcoat "Clay Met" from the firm Süd-Chemie AG, calcined and then likewise impregnated with a nickel nitrate solution.

Figure 2:
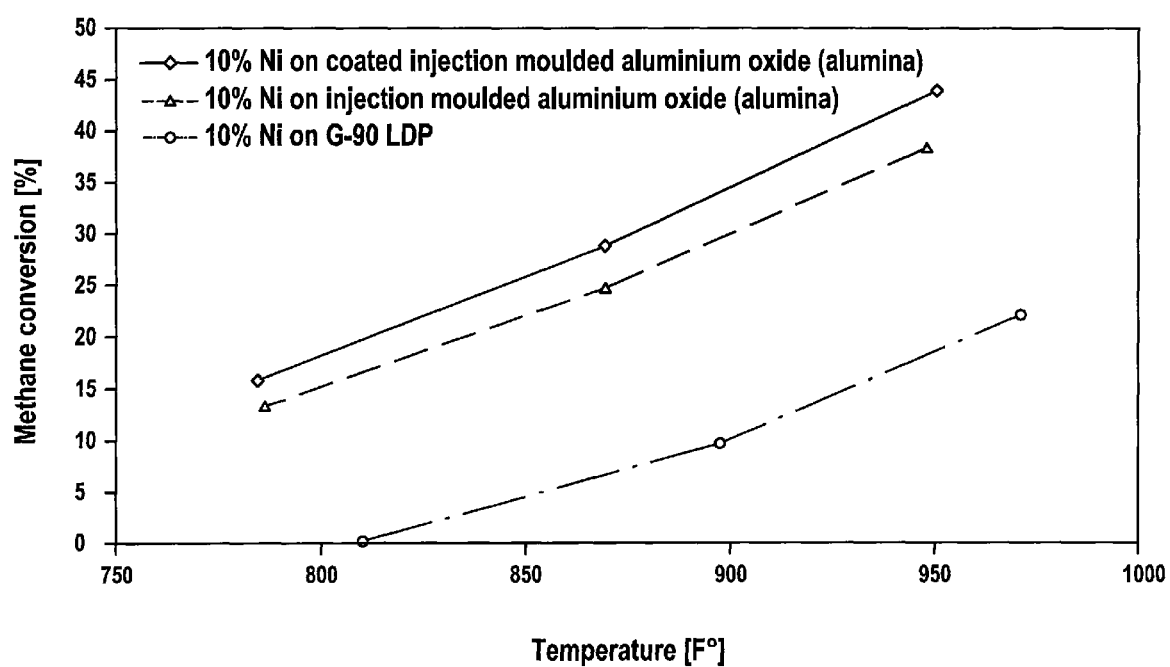
FIG. 2 depicts the results of activity tests on three samples of catalysts prepared as described in Example 3, wherein methane conversion vs. reaction temperature is plotted.
Figure 3:
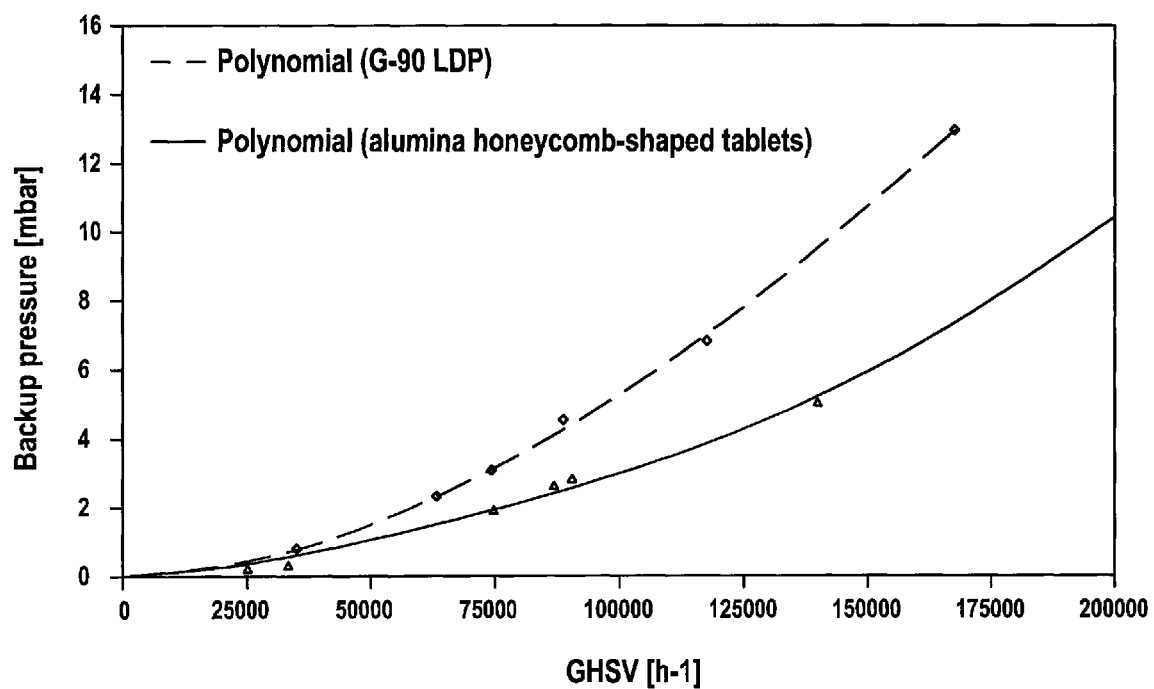
FIG. 3 depicts the results of activity tests on three samples of catalysts prepared as described in Example 3, wherein backup pressure vs. GHSV is plotted.

All three samples were subjected to an activity test. The results are clear from FIG. 2 and FIG. 3.

It is clearly discernible that the methane conversion with the injection moulded catalyst coated with washcoat is about 16% greater than with the conventional G-90 LDP. The pressure drop could be decreased by 10%.

The poorer results of the merely impregnated injection moulded carrier are attributable to the comparatively low BET surface area of only 0.4 m²/g.

Example 4

Determination of the Lateral Pressure Resistance

The Method is Carried Out with the "Mecmesin" Measuring Device

Start-up of the Measuring Device:
The crossbeam should be adjusted to the tablet type (see directions for use). Pull out the emergency cutout knob and set the mode switch to "Single Cycle". On the force-sensing device, press "On" and "Reset".
Measurement Procedure:
The splash guard must pushed up from the force bolt. The catalyst was laid with the side wall on the platform and the splash guard again pushed down. Next the "Start/Stop" switch was pressed to "Down" and released. After the breakage of the catalyst, the measured value is displayed and noted. After 50 measured values had been obtained, these were evaluated by means of a computer. In every case, the lateral pressure resistance is over 700 N, and in most cases over 1000 N.

The invention claimed is:
1. Catalyst with large surface area structure, characterised in that the large surface area structure is a honeycomb-shaped structure formed of a large number of parallel penetrating holes of round or polygonal cross-section, the honeycomb-shaped structure having 10 to 300 clear penetrating holes per cm² face area, where the catalyst contains 10 to 99 wt. % of at least one sinterable material and has a lateral pressure resistance of at least 700 N, wherein the at least one sinterable material is selected from the group consisting of metal oxides and ceramics.

2. Catalyst according to claim 1, wherein the cross-sections of the penetrating holes are round, triangular, rectangular and/or hexagonal.

3. Catalyst according to claim 1, wherein the at least one sinterable material is selected from aluminate, silicate, titanate, titanium dioxide, aluminium oxide, magnesium oxide, zirconium oxide, aluminium titanate, piezo ceramics, technical porcelain, steatite, cordierite, mullite ceramics, carbides, silicon carbide, boron carbide, nitrides, silicon nitride, aluminium nitride, silicon aluminium oxynitride, calcium aluminate, potassium aluminate or magnesium aluminate or combinations of the aforesaid.

4. Catalyst according to claim 1, wherein the at least one sinterable material includes a catalytically active material.

5. Catalyst according to claim 4, wherein the catalytically active material is selected from nickel, platinum, palladium, rhodium, ruthenium, copper, silver, gold, cobalt, manganese or iron.

6. Catalyst according to claim 1, wherein the catalyst additionally includes a washcoat coating.

7. Catalyst according to claim 6, wherein the washcoat coating has a large BET surface area and contains rare earths, preferably cerium/lanthanum and/or potassium/strontium.

8. Catalyst according to claim 6, wherein the washcoat includes a binder for increasing the washcoat adhesion.

9. Catalyst according to claim 8, wherein the binder is a sol and/or a metal salt solution.

10. Catalyst according to claim 9, wherein the sol is a sol of aluminium or cerium compounds.

11. Catalyst according to claim 10, wherein the metal salt solution is a saturated aluminium nitrate solution.

12. Catalyst according to claim 6, wherein the coating includes a catalytically active material, selected from nickel, platinum, palladium, rhodium, ruthenium, copper, silver, gold, cobalt, manganese or iron.

13. A process of steam reforming comprising catalyzing a steam reforming reaction with the catalyst according to claim 1.

14. A reactor, comprising the catalyst of claim 1.

15. The reactor according to claim 14, comprising a fixed bed, tubular or tube bundle reactor.

16. The reactor according to claim 14, wherein the catalyst is honeycomb-shaped or has another large surface-area structure and is present in the reactor in the form of a loose packing.

17. Process for the preparation of a catalyst with honeycomb-shaped structure having a lateral pressure resistance of at least 700 N comprising the steps of:
   a.) Grinding of a sinterable material to a powder, wherein the at least one sinterable material is selected from the group consisting of metal oxides and ceramics;
   b.) Treatment of the sinterable material with a dispersant;
   c.) Heating and mixing of the resulting composition so as to obtain a plastic mixture;
   d.) Injection of the plastic mixture into an injection mould;
   e.) Cooling, removal from mould and calcination of the mixture to form a catalyst comprising 10 to 99 wt. % of the sinterable material.

18. Process according to claim 17, wherein after the calcination of step e) a coating is applied onto the catalyst.

19. Process according to claim 18, wherein the coating of the catalyst is effected with a washcoat.

20. Process according to claim 18, wherein the catalyst is calcined after the coating.

21. Process according to claim 18, wherein a catalytically active material is fixed on the solid fraction of the washcoat before the coating.

22. Process according to claim 21, wherein the catalytically active material is selected from nickel, platinum, palladium, rhodium, ruthenium, copper, silver, gold, cobalt, manganese or iron.

23. Process according to claim 17, wherein the at least one sinterable material is selected from aluminate, silicate, titanate, titanium dioxide, aluminium oxide, magnesium oxide, zirconium oxide, aluminium titanate, piezo ceramics, technical porcelain, steatite, cordierite, mullite ceramics, carbides, silicon carbide, boron carbide, nitrides, silicon nitride, aluminium nitride, silicon aluminium oxynitride, calcium aluminate, potassium aluminate, magnesium aluminate or combinations of the aforesaid.

24. Process according to claim 17, wherein the at least one sinterable material also includes a catalytically active material.

25. Process according to claim 24, wherein the catalytically active material is selected from nickel, platinum, palladium, rhodium, ruthenium, copper, silver, gold, cobalt, manganese or iron.

26. Process according to claim 17, wherein the dispersant includes paraffin oil.

27. Process according to claim 17, wherein the heating of the composition is effected at 30 to 150° C.

28. Process according to claim 17, wherein the heating and mixing of the composition to obtain the plastic mixture is effected in an extruder.

* * * * *

UNITED STATES PATENT AND TRADEMARK OFFICE
CERTIFICATE OF CORRECTION

| | | Page 1 of 1 |
|---|---|---|
| PATENT NO. | : 8,349,758 B2 | |
| APPLICATION NO. | : 12/237772 | |
| DATED | : January 8, 2013 | |
| INVENTOR(S) | : Gabriel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this
Eleventh Day of November, 2014

Michelle K. Lee
*Deputy Director of the United States Patent and Trademark Office*